UNITED STATES PATENT OFFICE.

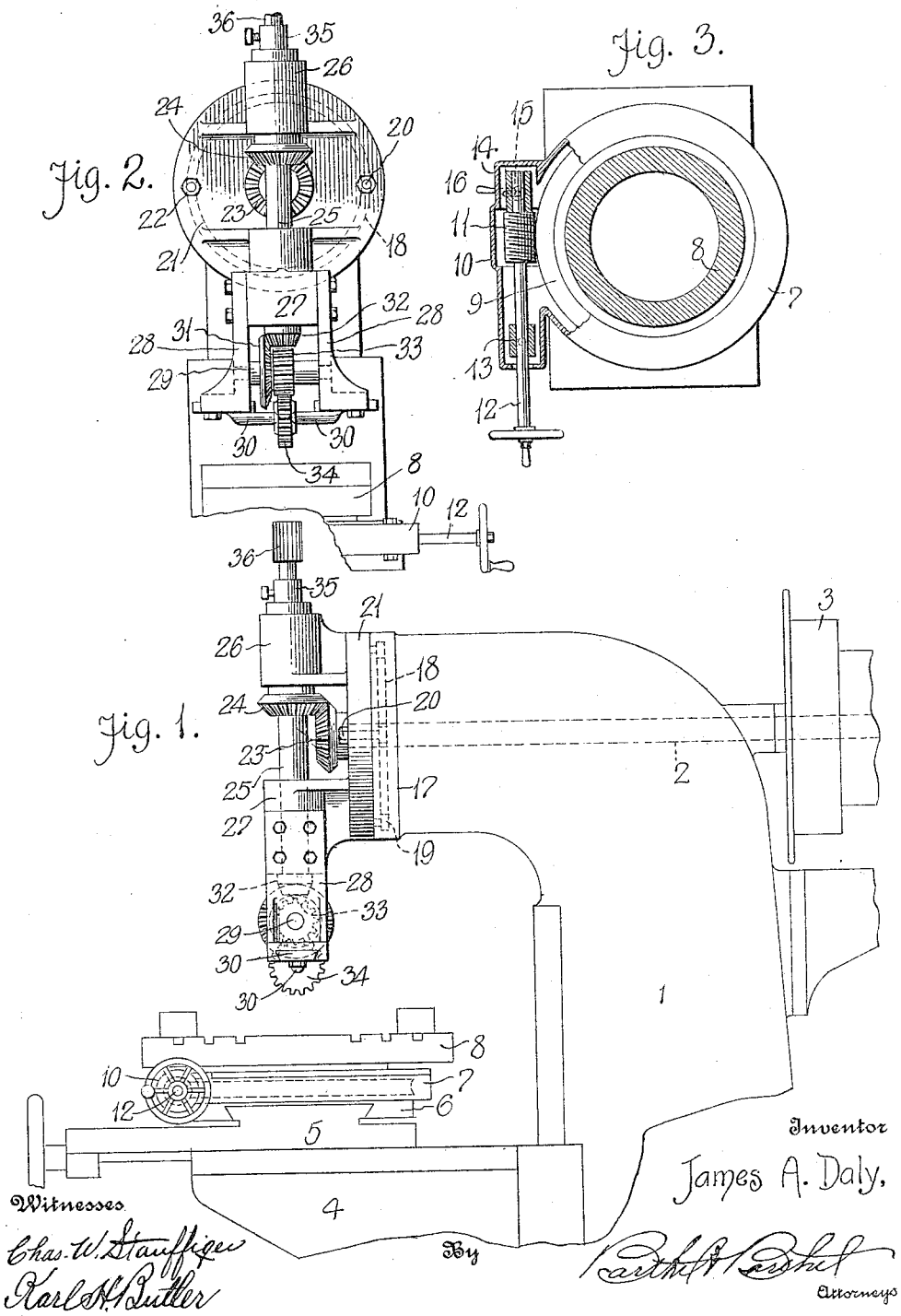

JAMES A. DALY, OF DETROIT, MICHIGAN.

MILLING ATTACHMENT.

1,212,330.  Specification of Letters Patent.  Patented Jan. 16, 1917.

Application filed February 7, 1916. Serial No. 76,552.

*To all whom it may concern:*

Be it known that I, JAMES A. DALY, a citizen of the United States of America, residing at Detroit, in the county of Wayne and State of Michigan, have invented certain new and useful Improvements in Milling Attachments, of which the following is a specification, reference being had therein to the accompanying drawings.

In the operation of die sinking and milling machines considerable time and labor is necessarily lost by changing cutters or other tools, for instance when substituting a horizontal cutter for a vertical cutter. Further time is lost by the ordinary screw adjustment of a work holder, and to produce a saving of time and labor, expedite adjustment, and permit of pieces of work being expeditiously operated upon, are among the objects of this invention, which are accomplished by a die sinking or milling machine provided with an adjustable rotatable cutter carrying head which can be adjusted to present a desired cutter to a piece of work. Associated with the adjustable rotatable cutter carrying head is a work holder which may be minutely adjusted in the well known manner, or the adjusting mechanism thrown out of gear whereby the work holder may be expeditiously adjusted to an approximate position and then again minutely adjusted to correctly present a piece of work to a cutter.

My invention further aims to provide certain improvements in connection with a die sinking or milling machine, without sacrificing rigidity or accuracy, and by which a high degree of efficiency is obtained in the production of various kinds of work.

My invention will be hereinafter described and then claimed, and reference will now be had to the drawing wherein—

Figure 1 is a side elevation of a portion of a die sinking or milling machine provided with improvements in accordance with my invention; Fig. 2 is a front elevation of a portion of the machine, and Fig. 3 is a horizontal sectional view of the table of the machine, illustrating the adjusting mechanism therefor.

In a die sinking or milling machine which embodies the leading characteristics of my invention, there is necessarily present a column 1, a counter shaft 2, a pulley 3, a knee 4, a transverse adjustable slide 5, a longitudinal adjustable slide 6, a table 7, and a work holder 8. The work holder 8 ordinarily has a circular rack or gear 9 within the table 7 and the table has a housing 10 for a worm 11 mounted upon a revoluble shaft 12, by which the work holder may be minutely adjusted.

To permit of the work holder 8 being spun or quickly revolved to place a piece of work in a desired position, I journal the shaft 12 in two bearings 13 and 14 within the housing 10. The bearing 13 is pivoted to permit of the worm 11 being moved out of mesh with the rack or gear 9, and the bearing 14 is shifted through the medium of an eccentric 15 and an operating lever 16, said lever being manipulated when it is desired to move the worm 11 into or out of engagement with the rack or gear 9 and to lock the same in a desired position. With the worm 11 out of engagement with the rack or gear 9 of the work holder, said work holder can be spun around to place a piece of work thereon in a desired position and then the worm 11 may be placed in mesh with the rack or gear 9 and said rack or gear minutely adjusted, just as though the work holder was incapable of rapid manipulation.

Another improvement is in connection with the cutter supporting means of the column 1. This column terminates in a circular column face 17 provided with an open annular groove 18 preferably T-shaped in cross section, to receive the heads 19 of bolts 20 adjustable circumferentially of the column face. The bolts 20 are diametrically opposed in a rotatable head 21 and said bolts have nuts 22 which permit of the rotatable head being locked in an adjusted position relative to the face.

The countershaft 2 extends through the rotatable head 21 and is provided with a beveled gear wheel 23 meshing with a similar gear wheel 24 mounted upon a spindle 25, journaled in vertically alining bearings 26 and 27, carried by the rotatable head 21. Connected to opposed sides of the bearing 27 are hangers 28 for a jack shaft 29 and adjustable cone bearings 30. The jack shaft 29 has a beveled gear wheel 31 meshing with a small beveled gear wheel 32 on the end of the spindle 25 protruding from the bearing 27 and on the jack shaft 29 is a pinion 33 meshing with the teeth or bits of a horizontal cutter 34 rotatably held by the cone bearings 30. The opposite end of the spindle 25 has a socket member 35 for a vertical cutter 36 or other tool, and by simply adjusting the rotatable head 21, either of the cutters may be swung into operative relation to a piece of work upon the work holder 8.

From the foregoing it will be observed that the vertical cutter 36 is disposed to be directly driven by the spindle 25 and that the horizontal cutter 34 is indirectly driven from said spindle, while the transmission gears 24 and 23 permit of either tool being driven from the countershaft 2 of the machine.

While the preferred embodiments of my invention have been illustrated, it is to be understood that the structural elements are susceptible to such variations and modifications as fall within the scope of the appended claim.

What I claim is:—

In a milling machine having an adjustable rotatable head, bearings carried thereby, and a spindle journaled in said bearings and driven from said milling machine; a cutter on said spindle, hangers carried by one of said bearings, a jack shaft journaled in said hangers and having its axis of rotation at right angles to said spindle, means for transmitting power from said spindle to said jack shaft, cone bearings carried by the lower ends of said hangers, a cutter supported by said cone bearings and having its axis of rotation parallel with said jack shaft and at a right angle to the axis of rotation of the spindle cutter, and a pinion on said jack shaft adapted to impart movement to said cutter.

In testimony whereof I affix my signature in presence of two witnesses.

JAMES A. DALY.

Witnesses:
ANNA M. DORR,
KARL H. BUTLER.

Copies of this patent may be obtained for five cents each, by addressing the "Commissioner of Patents, Washington, D. C."